United States Patent [19]

Colonna et al.

[11] 4,114,739
[45] Sep. 19, 1978

[54] SPRING FOR FREE-WHEELING DEVICE

[75] Inventors: Jérôme Colonna, Bobigny; Jean-Michel Monville, Paris; Francois Munoz, Marseille, all of France

[73] Assignee: SKF Compagnie d'Applications Mecaniques, Clamart, France

[21] Appl. No.: 768,564

[22] Filed: Feb. 14, 1977

[30] Foreign Application Priority Data

Feb. 24, 1976 [FR] France .................................. 76 05070

[51] Int. Cl.² ............................................ F16D 41/07
[52] U.S. Cl. ................................. 192/41 A; 192/45.1
[58] Field of Search ............................. 192/41 A, 45.1

[56] References Cited

U.S. PATENT DOCUMENTS

| 2,630,896 | 3/1953 | Dodge ................... 192/45.1 |
| 2,744,598 | 5/1956 | Troendly ................. 192/45.1 |
| 2,753,027 | 7/1956 | Troendly et al. ........... 192/45.1 |
| 2,824,635 | 2/1958 | Troendly et al. ........... 192/45.1 |

FOREIGN PATENT DOCUMENTS 928,560   6/1955   Fed. Rep. of Germany .......... 192/45.1

Primary Examiner—Allan D. Hermann
Attorney, Agent, or Firm—Brisebois & Kruger

[57] ABSTRACT

Spring 1 having principal undulations 2 inside which are formed windows 5 for the passage of cams 10, and secondary undulations 4. The cams are wedged between the edges 6 and 7 of these windows. The swinging of the cams is caused by the action of the swinging tongue 15 having a flat portion 17. An improvement in the synchronization of movement of the cams and a reduction in the wear of the device is obtained.

13 Claims, 8 Drawing Figures

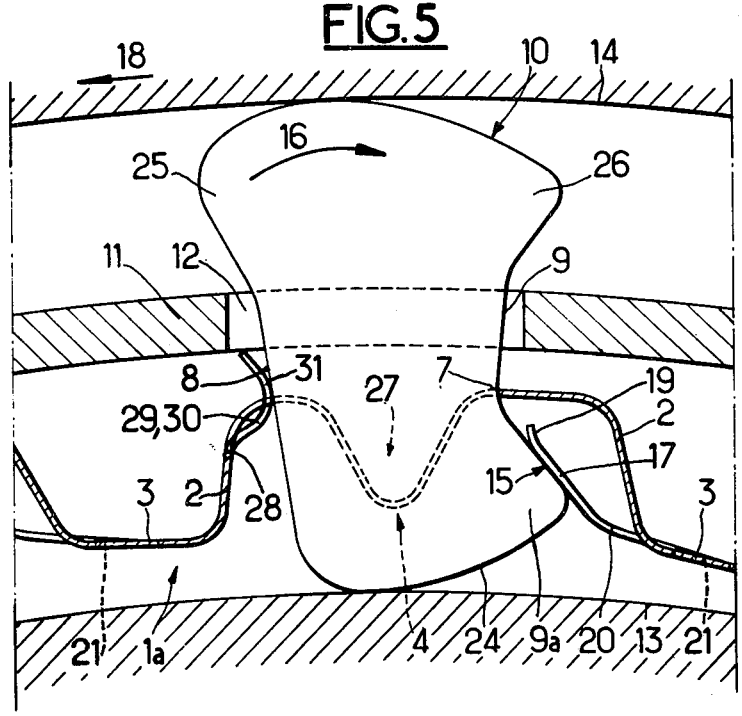
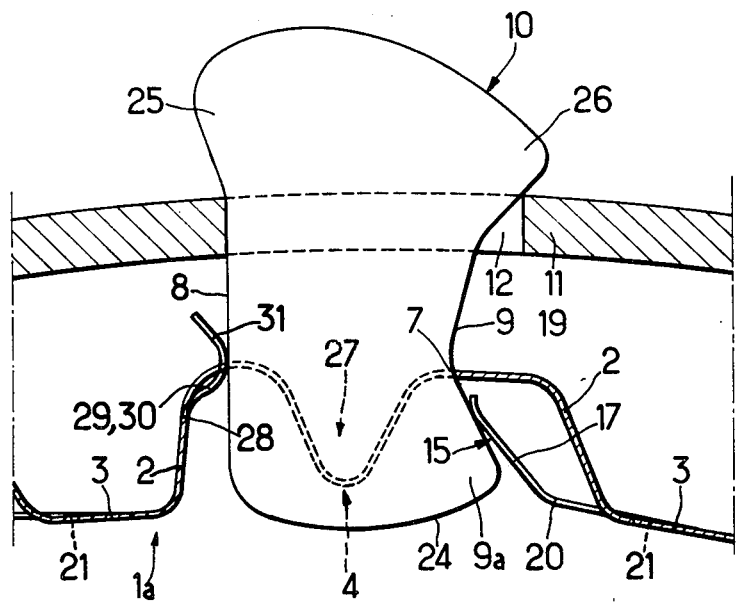

SPRING FOR FREE-WHEELING DEVICE

BACKGROUND OF THE INVENTION

This invention relates to a generally cylindrical spring provided with windows through which wedging cams extend. The spring is adapted to act on said wedging cams when they are engaged between the internal and external races of a free-wheeling device utilizing wedging cams. Said wedging cams may advantageously be held in windows formed in a cage. A certain number of embodiments of such springs are known. In these devices the springs bear on lateral surfaces of the cams of the free-wheeling device. These known springs have windows the edges of which define tongues which bear on the lateral faces of the wedging cams. (See for example U.S. Pat. Nos. 2,753,027; 3,219,163 and German Pat. No. 1,142,254.)

With these devices of a known type, certain difficulties are encountered in practice because the synchronization of the assembly of cams is poor. It has been found, in fact, that there is frequently a certain lack of rapidity in the response of the cams when the device is urged in the locking direction which appears to be due to an imperfect synchronization of the assembly of cams.

This defect appears to be due to the fact that springs of the known type generally act on the wedging cams only at two pivot points, with the swinging of one of the cams causing practically no reaction on the other adjacent cams.

An attempt has already been made to overcome this type of disadvantage by providing, for example, two concentric cages in a free-wheeling device, the spring being mounted between the cages which come in contact with the wedging cam and synchronize their movements (French Pat. No. 1,095,050). It will, however, be understood that such a device has the disadvantage of multiplying the number of elements and thus increasing the complexity and cost of the free-wheeling device.

It is the object of the present invention to provide a spring for a free-wheeling device of the type utilizing wedging cams which is simple to make and which, by reason of its configuration, holds the cams perfectly in position and provides a floating mounting for said cams so as to obtain an improved synchronization and less wear on the cams. The spring according to the invention makes it possible to limit the drag torque of the free-wheeling device while making it possible to define the position of the cam with greater precision during free-wheeling operation.

It is also an object of the invention to provide a spring the configuration of which is such that centrifugal force caused by rotation of the free-wheeling device has a tendency to provoke at high speeds of rotation, a pivotal movement of the cams which reduces their wear.

It is a further object of the invention to provide an assembly formed by a plurality of cams, a spring acting on the cams, and a cage so that this assembly forms a perfectly cohesive unit.

Another object of the invention is to provide a device of the free-wheeling type using wedging cams which is equipped with a spring adapted to limit the wear of the cams and the races while assuring improved synchronization of the assembly of cams during wedging.

The springs of the free-wheeling device utilizing wedging cams according to the invention comprises windows through which the cams pass and at least one tongue coming to bear on each cam. In accordance with the invention the spring has a series of principal undulations provided with windows and separated from each other by substantially cylindrical portions. Each principal undulation has, near its summit, a secondary undulation which thus exists on each side of the windows. The dimensions of these windows are such that their edges grip the cams on entry in substantially perpendicular contact with the lateral faces of the cams. A swinging tongue is moreover formed in the spring and bent toward the outside so as to act on one of the lateral faces of each cam in the direction which improves the wedging action. The swinging tongue preferably has a flat portion capable of entering into contact with one corresponding flat portion of the lateral face of the cam in sliding position in order to precisely define this position.

In a preferred embodiment the tongue has a trapezoidal profile the width of which decreases toward the free end so as to impart thereto a substantially equal resistance to the flexing over its entire length. Moreover, the edges of the tongue are connected to the spring in a substantially cylindrical portion of the latter and tangentially to perforations formed in the spring on each side of the tongue in order to avoid the initiation of cracks. In another embodiment of the invention the wedging contact between the cam and the edge of each window opposite the swinging tongue is produced by means of one or more wedging tongues curved toward the inside and having a rounded zone of contact. It is thus possible to decrease the strains on the secondary undulation of the spring.

The invention will be better understood from a study of the two particular embodiments hereinafter described by way of example and illustrated in the accompanying drawings, on which:

FIG. 5 is a schematic partial sectional view analogous to FIG. 1, taken through another embodiment of a free-wheeling device according to the invention;

FIG. 6 is a view analogous to FIG. 2 of a second embodiment, showing the assembly constituted by a cam, cage and spring before mounting in the free-wheeling device;

In the first embodiment of the invention as shown in FIGS. 1 to 4, it will be seen that the generally cylindrical spring 1 is formed with a succession of principal undulations 2 separated by substantially cylindrical portions 3. It should be noted that during manufacture of the spring and especially during its forming, those portions 3 which are substantially cylindrical in the free-wheeling device are flat portions, the principal undulations lying all on the same side of the plane defined by the portions 3. Such a structure is particularly advantageous for manufacturing the spring according to the invention by forming, since it makes it possible to define with precision a flat reference surface from which the undulating parts of the spring are formed.

Figure 4:
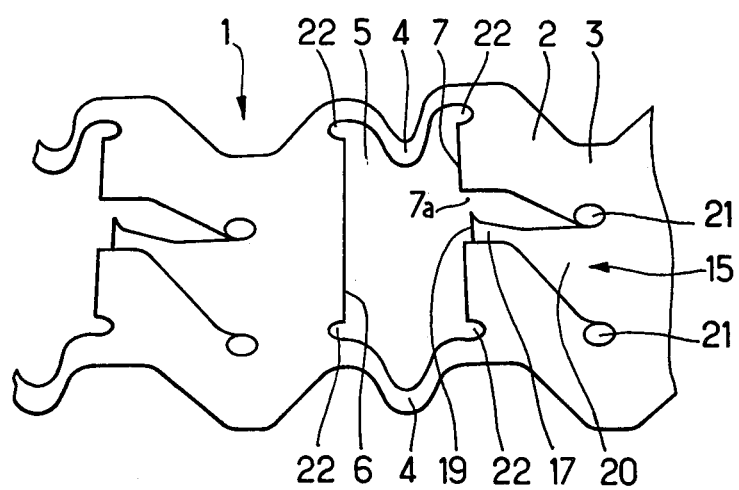
FIG. 4 is a partial perspective view of the spring visible on FIGS. 1 and 2.
Figure 7:
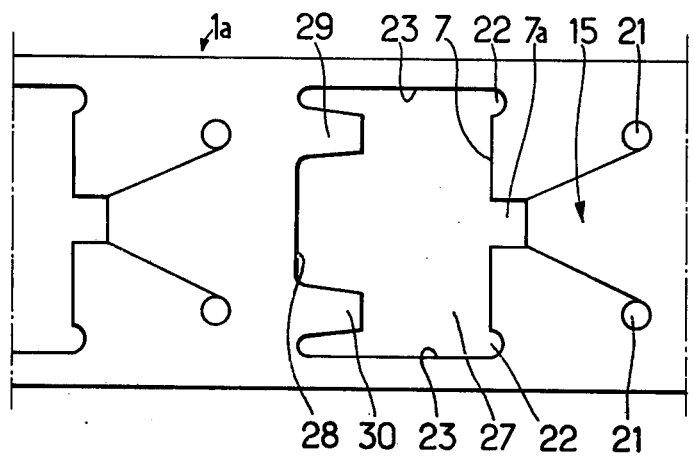
FIG. 7 is a partial view of a cut-out metallic strip which, after forming and cutting out, may be made into the spring shown on FIGS. 5 and 6.
Figure 8:
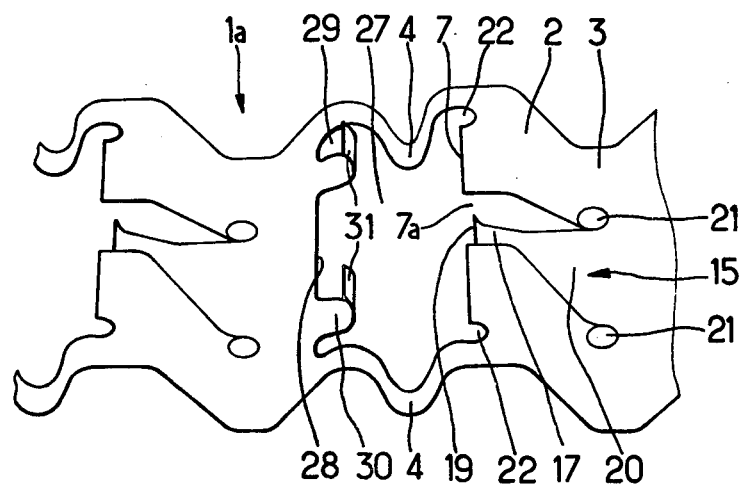
FIG. 8 is a partial perspective view of the spring of FIGS. 5 and 6.

The principal undulation 2 has near its summit a secondary undulation 4 at the level of which is formed the window 5, visible especially on FIG. 4, and the edges 6 and 7 of which come to grip the lateral surfaces 8 and 9 of a cam 10. As may be seen on FIG. 1, the shape of the undulation 2 and the position of the window 5 are such that the edges 6 and 7 of said window enter into contact in a substantially perpendicular manner with the lateral faces 8 and 9 of the cam 10. The secondary undulation 4 makes it possible to obtain good elasticity in gripping the cam 10. The free-wheeling device such as shown on FIG. 1 also comprises a cage 11 having a cylindrical shape and in which are formed the windows 12, the dimensions of which are such that they permit the introduction of the cams 10 from the outside toward the inside.

The assembly consisting of the spring 1, the cage 11, and the cams 10, may be mounted between an internal race 13 and an external race 14 which are concentric to form a free-wheeling device utilizing wedging cams. It will be noted that the spring 1, the cage 11, and the internal and external races 13 and 14 have a common axis of symmetry which is the axis of rotation of the free-wheeling device. In the present description, those members nearest this axis of symmetry are identified as "internal", the other members being identified as "external".

The spring 1 comprises for each cam 10 a swinging tongue 15 which is bent inwardly so as to act on the internal part 9a, preferably having the shape of a boss, on the lateral surface 9 of the cam 10, in a direction which improves gripping by swinging the cam 10 in the direction of the arrow 16.

The swinging tongue 15 has a central portion 17 which is substantially flat and is capable of entering into contact with a corresponding flat portion of the part 9 in the normal sliding position of the free-wheeling device, which thus constitutes a preferential equilibrium position. In this position, in effect, the external race 14 may move with respect to the internal race 13 in the direction of the arrow 18. The cooperation of these two opposite portions takes place respectively on the tongue 15 and on the part 9 of the cam and makes it possible to define with precision the normal sliding position of the cams 19 and thus to substantially reduce the drag torque of the free-wheeling device.

Tongue 15 has, moreover, a slightly curved free end 19 making it possible to facilitate the introduction of cams 10 so that the portion 9a comes properly to bear on the tongue 15.

Figure 3:
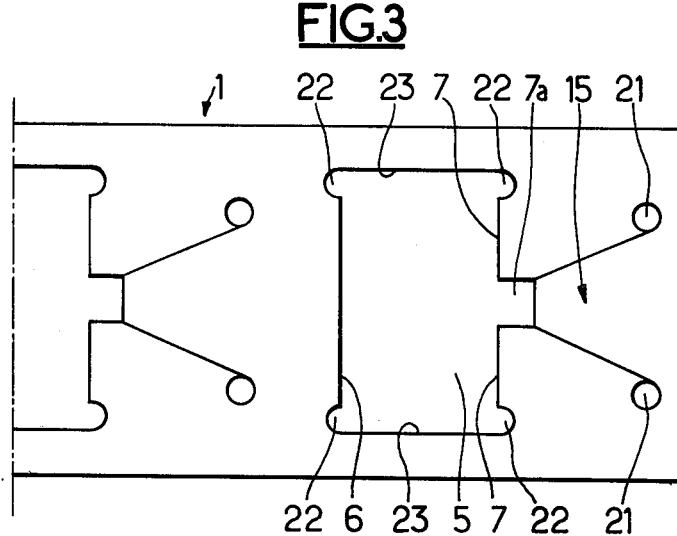
FIG. 3 is a partial view of a cut-out metallic strip from which, after forming and cutting out, a spring in accordance with the preceding figure is made.

As may be seen more particularly on FIGS. 3 and 4 the spring 1 is obtained from a continuous metallic strip which is flat and which is first cut out as shown in FIG. 3 to form openings or windows 5 and the cut-outs which, after forming, make it possible to produce the tongues 15, are positioned at an equal distance from the sides of the metallic strip constituting the spring. As one sees on these figures, the tongues 15 preferably have a trapezoidal shape the width of which decreases toward the free end. In this way the tongues 15 have a resistance to flexing which is substantially equal over their entire length and which clearly increases the longevity of the spring.

For the same reasons, it will be seen that the base 20 of the tongues 15 is connected to the spring 1 in one of the substantially cylindrical portions 3, the edges of the tongues 15 coming into tangential contact with the perforations 21 formed in said cylindrical portion 3 of the spring at each side of the tongue 15. One thus avoids initiating any crack. The base 20 of the tongues 15 is preferably substantially flat and in alignment with the corresponding portion 3. It is connected to the central portion 17 by a rounded part. It results from this structure that the zone of maximum stress which corresponds to the junction of the base 20 and the portion 3 of the spring includes no bend. This substantially reduces the risk of breakage. Moreover, as one may see, in particular on FIG. 3, the free end of the tongue 15, before forming, is recessed from the edge 7 of the window 5 by leaving a small rectangular recess 7a. In order to also avoid any initiation of cracks at the level of windows 5, the corners of the latter are rounded at 22 tangent to the lateral edges 23 of the windows 5. As one may see on FIG. 1, the cam 10 is suitably gripped between the edges 6 and 7 of the window 5, said gripping being rendered elastic by the existence of the secondary undulation 4. The cam 10 is thus held between two pivots constituted by the lines of contact between the cam and the edges of the window 5, the swinging of the cam 10 being assured by the tongue 15. It will be noted that the undulations 2 of the spring 1 have a sufficient amplitude to fill the major part of the space between the cage 11 and the internal race 13. Neither the summits of the undulations 2 nor the cylindrical portions 3 touch, however, the cage 11 or the internal race 13.

This undulating form of the spring 1 and the existence of the principal undulations 2 makes it possible to compensate for any imprecisions in manufacture which might lead to irregularities in the pitch of the windows 12 of the cage 11. Moreover, during operation of the free-wheeling device, for example, at a speed of rotation of the order of 5 – 6,000 RPM, the cage 11 is caused, by friction means not shown on the figures, to turn substantially at the same speed as the movable race which is, in the example illustrated on the drawings, the outer race 14 but which may also be the inner race 13 in another embodiment. The cage 11 thus drives the cams 10 at a high speed, together with the spring 1, which is thus deformed by the action of centrifugal force. This deformation has a tendency to cause pivoting of the cams 10 in the direction contrary to that of the arrow 16 and a reduction in wear of the internal sliding surfaces 24 of the cams 10 and the internal race 13. Moreover, the particular shape of the undulating spring 1 has for a consequence that the pivoting of one of the cams 10 causes by reaction a slight displacement of the cylindrical portions 3 of the spring which leads in its turn to an action on the tongue 15 of the immediately adjacent cam which is then caused to pivot in the same direction as the first. It will thus be seen that the pivoting of one of the cams has immediate repercussions on the entire group of cams in the device so as to cause an excellent synchronization of the pivoting of the various cams 10. These synchronization characteristics are related to a great rapidity in response of the spring due to its particular configuration and make it possible to obtain a great reliability of operation and a remarkable longevity of the free-wheeling device according to the present invention. It should be noted that the cage 11 which may come into contact with the lateral surfaces of the cams 10 has practically no influence on the synchronizing effect which is essentially due to the spring.

Figure 1:
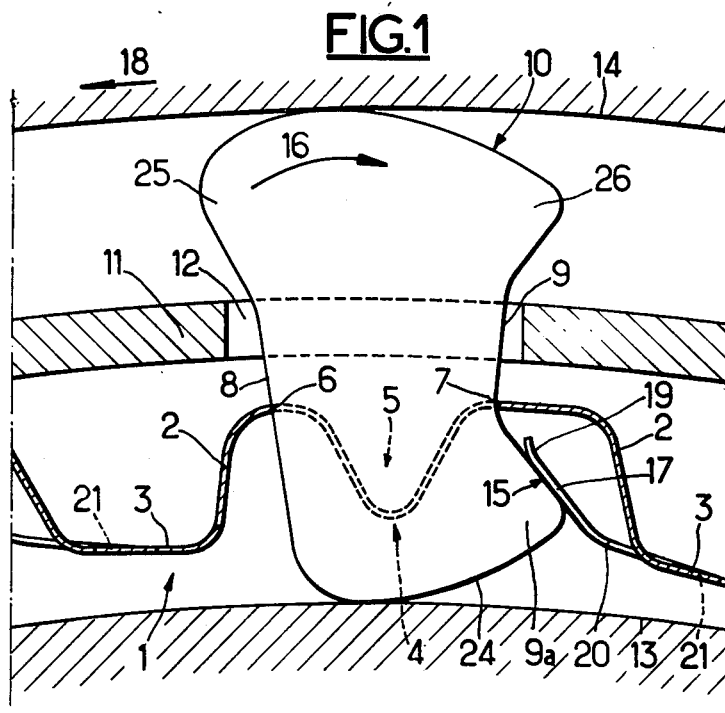
FIG. 1 is a schematic partial sectional view of a free-wheeling device in accordance with the first embodiment of the present invention showing one of the cams positioned between the internal and external races by means of a spring according to the invention.
Figure 2:
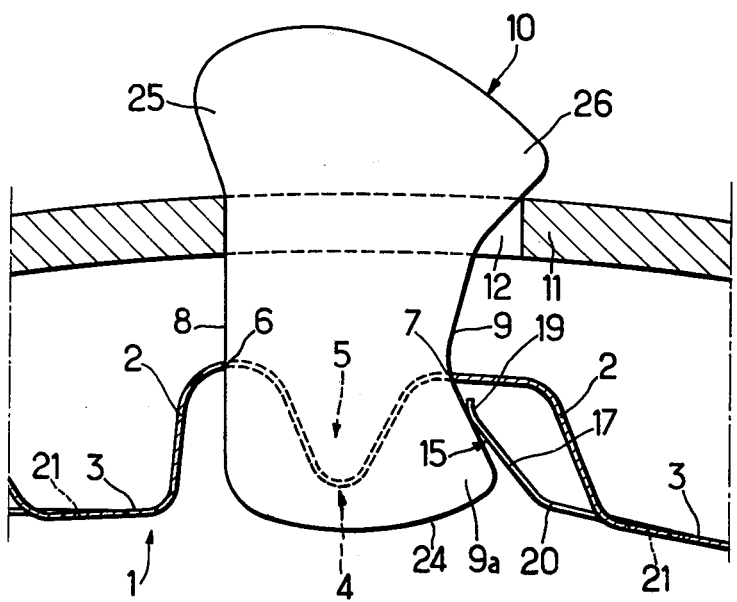
FIG. 2 is a partial schematic sectional view showing a cam fastened to a cage by means of a spring identical to that of FIG. 1, the assembly not yet having been mounted in the free-wheeling device.

Referring now more particularly to FIG. 2, it will be seen that when the cams 10 are not mounted between the inner race 13 and the lateral race 14 as shown in FIG. 1, the assembly constituted by the cams 10 the cage 11 and the spring 1 is perfectly cohesive. In this position the swinging tongue 15 always comes to bear on the protuberance 9a of the lateral surface 9 of the cam 10, but this time no longer on the plane portion 17 but instead on the rounded portion which connects this plane portion to the end 19 of the tongue 15. The spring 1 acting on the cams 10 causes a descent thereof with respect to the window 12 of the cage 11.

In the example illustrated the cam 10 has advantageously a cross section such that it cannot be extracted from the windows 12 of the cage 11 by passing it from the outside to the inside. The external part of the cams 10 has for this purpose two protuberances 25 and 26 which make the passage of this external portion of the cam 10 through the windows 12 of the cage 11 impossible. These protuberances 25 and 26 come into contact with the edge of the windows 12, the cams 10 thus remaining held by the action of the spring 1. For a more exact description of the cams which it is possible to use in the present invention one may refer to French Pat. Nos. 7,020,610 and 7,123,782. Of course, it will be understood that other types of cams may be used in combination with the spring of the invention. During the mounting of the cams 10 the inner portion of the cams is introduced into the windows 12 of the cage 11, then into the windows 5 of spring 1 and act against the end 19 of the swinging tongues 15 which permits snap fitting of the cam 10 once protuberance 9a has passed the end 19. After this mounting operation the cams 10 are perfectly held in place in the windows 12 of the cage 11 by means of the tongues 15. It is not possible to withdraw the cams 10 without exerting a relatively substantial force on their inner portion. In this manner the cohesive assembly thus constituted by the cams 10, the cage 11 and the spring 1 may be easily stored and sold as a unit. It will be understood that this result may also be obtained without the cage 11, the cams 10 being then simply held by their protuberances 25 and 26 in the windows 5 of the spring.

In order to decrease the stresses which are exerted at the edges of the windows 5 during the wedging of the cams 10 it is possible to provide a wedging tongue positioned opposite the swinging tongue 15. FIGS. 5 to 8 show such an embodiment. As may be seen on these figures, on which the members identical to those of the preceding figures carry the same reference numerals, the spring 1a has a position substantially identical to that of the spring 1 in the preceding embodiment, with windows 27, the edge 28 of which remote to the edge 7 of the side carrying the swinging tongue 15 has two projecting parts constituting two wedging tongues 29 and 30.

As may be better seen on FIG. 5 the wedging tongues, such as the tongue 29 comprise a substantially radial portion 30 curved inwardly and extended as a rounded portion 31 forming a zone of contact with the lateral surface 6 of the cam 10. In this embodiment the cams 10 are thus wedged inwardly of the windows 27 of the spring 1a between one of the edges 7 of said windows on the one hand and the wedging tongues 29 and 30 on the other hand. The function of the swinging tongue 15 is identical to that function in the preceding embodiment. The same results are obtained when the device is not mounted between an internal race and an external race as may be seen in FIG. 6.

While FIGS. 5 to 8 illustrate an embodiment comprising two lateral wedging tongues 29 and 30, it will be appreciated that it would be possible to provide a different number of wedging tongues, even a single wedging tongue the width of which would then be sufficient to hold the cams 10 in proper position.

The present invention makes it possible to provide a free-wheeling device having excellent operating characteristics using a spring of simple manufacture.

What is claimed is:

1. A spring structure for a free-wheeling device comprising a formed and cut out metallic strip having means defining a series of principal undulations separated by substantially cylindrical portions, each of said principal undulations having near its outer summit portion a window for receiving a wedging cam and which is gripped between opposite edges of said window, and a secondary undulation in the material of the strip on each side of the window for improving the elasticity of the cam gripping, means defining a series of cam swinging tongues, one adjacent each such window, each tongue being bent outwardly and having a substantially flat base portion integral with and in substantial alignment with a cylindrical portion of said strip adjacent each such window, said tongue including a central portion engagable with a corresponding portion of a wedging cam for swinging the cam in a direction improving wedging.

2. Spring according to claim 1 in which the swinging tongue has a trapezoidal profile the width of which decreases toward its free end so as to impart to said tongue a substantially equal resistance to flexing throughout its length.

3. Spring according to claim 1 in which the edges of the swinging tongue are connected to the spring tangentially of perforations (21) formed in the spring on each side of the tongue.

4. Spring according to claim 1 characterized by the fact that the corners of each window are provided with rounded parts (22) to avoid initiating cracks.

5. A spring structure for a free-wheeling device comprising a formed and cut out metallic strip having means defining a series of principal undulations, separated by substantially cylindrical portions, each of said principal undulations having near its outer summit portion a window for receiving a wedging cam, the dimensions of the window being such that their edges grip the cam elastically in substantially perpendicular contact with lateral surfaces of the cam, and a secondary undulation in the material of the strip on each side of the window for improving the elasticity of the cam gripping, means defining a series of cam swinging tongues, one adjacent each such window, each tongue being bent outwardly and having a substantially flat base portion integral with and in substantial alignment with a cylindrical portion of said strip adjacent each such window, said tongue including a central portion engagable with a corresponding portion of a wedging cam for swinging said cam in a direction improving wedging.

6. A spring structure for a free-wheeling device comprising a formed and cut out metallic strip having means defining a series of principal undulations separated by substantially cylindrical portions, each of said principal undulations having near its outer summit portion a window for receiving a wedging cam, the dimensions of the window being such that said cam is elastically gripped between the edges of said window, and a secondary undulation in the material of the strip on each side of the window for improving the elasticity of the cam gripping, means defining a series of cam swinging tongues, one adjacent each such window, each said tongue being bent outwardly and having a substantially flat base portion integral with and in substantial alignment with a cylindrical portion of said strip adjacent each such window, said tongue including a substantially flat central portion engagable with one corresponding flat portion of a lateral face of the wedging cam, to place the cam in preferentail equilibrium position.

7. A spring structure for a free-wheeling device comprising a formed and cut out metallic strip having means defining a series of principal undulations separated by substantially cylindrical portions, each of said principal undulations having near its outer summit portion a window for receiving a wedging cam, the dimensions of the window being such that said cam is elastically gripped between the edges of said window, and a secondary undulation in the material of the strip, on each side of the window for improving the elasticity of the cam gripping, means defining a series of cam swinging tongues, one adjacent each such window, each said tongue being bent outwardly and having a substantially flat base portion integral with and in substantial alignment with a cylindrical portion of said strip, adjacent each such window, said tongue including a central portion capable of entering into contact with a corresponding portion of a wedging cam for swinging the cam in a direction improving wedging, and a curved free-end to facilitate introduction of the wedging cam into said window.

8. A spring structure for a free-wheeling device comprising a formed and cut out metallic strip having means defining a series of principal undulations separated by substantially cylindrical portions, each of said principal undulations having near its outer summit portion a window for receiving a wedging cam and which is gripped between two opposite edges of said window, and a secondary undulation in the material of the strip on each side of the window for improving the elasticity of the cam gripping, means defining a series of cam swinging tongues, one adjacent each such window, each said tongue being bent outwardly and having a substantially flat base portion integral with and in substantial alignment with a cylindrical portion of said strip adjacent each such window, the edges of the base portion of said tongue coming into tangential contact with round perforations formed in said cylindrical portion of the spring at each side of the swinging tongue, and a central portion engagable with a corresponding portion of said wedging cam for swinging said cam in a direction improving wedging.

9. In a free-wheeling device comprising an internal race and a concentric external race, a series of wedging cams disposed between said internal and external races and swingable in a first direction into wedging engagement with both said races and in a second opposite direction to disengage said cams, means defining a substantially cylindrical cage having a series of windows for radially inward introduction of said cams, a formed and cut out metallic strip retaining said cams and having means defining a series of principal undulations separated by substantially cylindrical portions, each of said principal undulations having near its outer summit portion a window for receiving a wedging cam which is gripped between two opposite edges of said window, and a secondary undulation in the material of the strip on each side of the window for improving the elasticity of the cam gripping, means defining a series of swinging tongues, each tongue being bent outwardly and having a substantially flat base portion integral with an in substantial alignment with a cylindrical portion of said strip adjacent each such window, said tongue including a central portion engagable with a corresponding portion of a wedging cam for swinging said cam into wedging engagement with both said races.

10. A cage and gripper structure for a free-wheeling device comprising a cage having a substantially cylindrical shape in which a series of windows are formed for inward introduction of a plurality of wedging cams, a plurality of wedging cams introduced in said windows of said cage, a formed metallic strip of generally cylindrical shape concentric with said cage and retaining said cams, said metallic strip having means defining a series of principal undulations separated by substantially cylindrical portions, each of said principal undulations having near its outer summit portion a window for receiving one of said wedging cams in gripping relation between two opposite edges of said window, and a secondary undulation in the material of the strip on each side of said window for improving the elasticity of the cam gripping, means defining a series of swinging tongues, one adjacent each such window, each tongue being bent outwardly and having a substantially flat base portion integral with and in substantial alignment with a cylindrical portion of said strip adjacent each such window, said tongue including a central substantially flat portion engagable with a corresponding flat portion of a lateral face of the wedging cam.

11. A spring structure for a free-wheeling device comprising a formed and cut out metallic strip having means defining a series of principal undulations separated by substantially cylindrical portions, each of said principal undulations having near its outer summit portion a window for receiving a wedging cam, said window having one edge capable of entering in gripping contact with a first lateral surface of said cam and an opposite edge having means defining at least one wedging tongue with a rounded end portion capable of contacting a second lateral surface of said cam, and a secondary undulation in the material of the strip on each side of the window for improving the elasticity of the cam gripping, means defining a series of cam swinging tongues adjacent each such window, each cam swinging tongue being bent outwardly and having a substantially flat base portion integral with and in substantial alignment with a cylindrical portion of said strip adjacent each such window, said tongue including said swinging tongue being positioned at each window on the side of said one edge and having a central portion engagable with a corresponding portion of a wedging cam for swinging the cam in a direction improving wedging.

12. Spring according to claim 11 in which the wedging contact on the edge of each window remote from the swinging tongue takes place through at least one gripping tongue curved inwardly and having rounded zone of contact.

13. Spring according to claim 12 in which there are two wedging tongues (29,30) at each window.

* * * * *